(12) United States Patent
Ando et al.

(10) Patent No.: US 6,758,458 B2
(45) Date of Patent: Jul. 6, 2004

(54) BUTTERFLY VALVE

(75) Inventors: Hiroshi Ando, Nagano (JP); Yoshiharu Sato, Yamanashi (JP)

(73) Assignee: Kitz Corporation, Chiba (JP)

( * ) Notice: Subject to any disclaimer, the term of this patent is extended or adjusted under 35 U.S.C. 154(b) by 0 days.

(21) Appl. No.: 10/250,445

(22) PCT Filed: Feb. 26, 2002

(86) PCT No.: PCT/JP02/01732

§ 371 (c)(1),
(2), (4) Date: Jul. 1, 2003

(87) PCT Pub. No.: WO02/068846

PCT Pub. Date: Sep. 6, 2002

(65) Prior Publication Data

US 2004/0051071 A1 Mar. 18, 2004

(30) Foreign Application Priority Data

Feb. 26, 2001 (JP) ........................................ 2001-050665

(51) Int. Cl.[7] ................................................ F16K 1/22
(52) U.S. Cl. ...................................... 251/305; 251/208
(58) Field of Search ................................ 251/205–209, 251/305–308

(56) References Cited

U.S. PATENT DOCUMENTS

| 4,327,765 | A | * | 5/1982 | Wilson et al. | ............... | 137/312 |
| 4,901,763 | A | * | 2/1990 | Scott | ...................... | 137/625.47 |
| 5,692,725 | A | * | 12/1997 | Fehringer | ................... | 251/306 |
| 6,332,600 | B2 | * | 12/2001 | Eggleston | ................... | 251/214 |

FOREIGN PATENT DOCUMENTS

| JP | 57-157866 | 9/1982 |
| JP | 62-6568 | 1/1987 |
| JP | 5-8139 | 2/1993 |
| JP | 5-78713 | 10/1993 |
| JP | 07-208615 | 8/1995 |
| JP | 7-43553 | 10/1995 |
| JP | 2589805 | 11/1998 |

* cited by examiner

Primary Examiner—Paul J. Hirsch
(74) Attorney, Agent, or Firm—Wenderoth, Lind & Ponack, L.L.P.

(57) ABSTRACT

Provided is a butterfly valve that prevents occurrence of erosion, thereby rendering it possible to secure fine adjustment of a volumetric flow rate of a fluid in an area of low degree of valve opening or in an area of minute degree of valve opening, to infallibly attain high range ability. This invention provides a butterfly valve for opening and shutting an interior of an elastic seat ring 2 mounted in a cylindrical valve casing 1 by rotation of a disc valve member 3, wherein the butterfly valve comprises depressing valve parts 10 and 11 provided at least on an orifice side 8 of the valve member 3 and adapted to make depressing contact with the elastic seat ring 2 in the area of low degree of opening or in the area of minute degree of opening of the valve member 3, a void part 12 formed along an outer peripheral edge of the valve member 3 or at a downstream side position of the outer peripheral edge, and communicating parts 13 formed in the valve member 3 or the depressing valve parts 10 and 11 to establish communication from the void part 12 toward a downstream side.

7 Claims, 13 Drawing Sheets

BUTTERFLY VALVE

TECHNICAL FIELD

This invention relates to butterfly valves of the type possessing a function of establishing tight shut and preventing itself from developing erosion as a matter of course, and enabling even a minute flow volume to be duly adjusted particularly in the area of small degree of opening or the area of minute degree of opening and exhibiting a prominent effect in high range ability.

BACKGROUND ART

Butterfly valves, on account of distinctions, such as simplicity of structure, lightness and low operating force, are being used as stop valves or, depending on purposes of application, as flow volume adjusting valves. Particularly when such a butterfly valve is used as a flow volume adjusting valve, it has the possibility of not only generating cavitation on the downstream side of the valve member to emit vibration and noise but also inducing the so-called erosion, namely the phenomenon of the valve member and the adjunct piping yielding to damage and corrosion.

With the object of solving these problems, various countermeasures have been proposed.

JP-A SHO 57-157866, for example, discloses a method for repressing the cavitation which would occur on the downstream side of the valve member by providing the outer peripheral edge of the valve member with spaced projections resembling the teeth of a comb and causing the projections to transform a fluid into a jet. JUM-A SHO 62-6568 discloses a method for rectifying the turbulence of a fluid by providing the opposite outer peripheral parts of a valve member each with a belt member and forming a group of numerous small holes in each of the belt members. JP-B HEI 05-78713 or JUM-A HEI 05-8139 teaches a means for preventing the cavitation by fitting the valve member on the secondary side thereof with a rectifying plate. JUM-C 2589805 concerns a butterfly valve which is intended to repress the cavitation by fitting an eccentrically shaped valve member on one side thereof with a wing member and forming a multiplicity of small holes in the wing member, and JUM-B HEI 07-43553 concerns a butterfly valve which is intended to repress the cavitation by forming small through holes in circular flanges on the opposite sides of a valve member. JP-A HEI 07-208615 also concerns a valve which is intended to repress the cavitation by forming small holes in each of the laterally opposite wing members of a valve member.

Since the conventional methods cited above invariably have as their main objects the attainment of the prevention of the cavitation by rectifying the flow of a fluid, they are substantially incapable of either effecting fine adjustment of a fluid in the area of low degree of opening or the area of minute degree of opening or offering a fully satisfactory control valve for the adjustment of a flow volume in the area of low degree of opening or the area of minute degree of opening. Thus, a practicable butterfly valve possessed of an efficient performance of high range ability has not been realized to date. Such is the actual state of affairs.

The butterfly valves of the type intended for use in air conditioners, for example, are used in a fully opened state in the summer season which demands full use of the air conditioners, whereas they are generally used as retained in the area of low degree of opening or the area of minute degree of opening which falls in the range of adjustment of not more than 40% of the degree of opening in the other seasons. Depending on the purpose of use, the valves of this type are used frequently for controlling the fluid in the area of low degree of opening or the area of minute degree of opening.

Particularly, many of these butterfly valves are used in a state having their valve seats fitted with an annular rubber seat. When they are used in the area of low degree of opening or the area of minute degree of opening, the volumetric flow rate of the fluid is increased because the flow path between the valve member and the rubber seat is narrowed and this increased volumetric flow rate possibly induces the rubber seat to succumb to the so-called phenomenon of erosion.

This invention has been developed for the purpose of solving the various problems encountered by the conventional butterfly valves and has for the object thereof the provision of a butterfly valve which possesses a function of resisting cavitation, prevents occurrence of erosion as a matter of course, permits fine adjustment of the fluid in the valve in the area of minute degree of opening or the area of low degree of opening, manifests a high range ability, and excels in the function of control and the function of tight shut.

DISCLOSURE OF THE INVENTION

To attain the above object, the present invention provides a butterfly valve for opening and shutting an interior of an elastic seat ring mounted in a cylindrical valve casing by rotation of a disc valve member, wherein the butterfly valve comprises a depressing valve part formed at least on a side of an orifice of the valve member and adapted to make depressing contact with the elastic seat ring in an area of low degree of valve opening or in an area of minute degree of valve opening, a void part formed along an outer peripheral edge of the valve member or at a position of a downstream side of the outer peripheral edge, and a communicating part formed in the valve member or depressing valve part and adapted to form communication from an interior of the void part toward the downstream side.

The butterfly valve further comprises tight-shut valve shutting parts formed along the outer peripheral edge of the valve member and including a valve shutting part disposed on the orifice side, and a site of an increased wall thickness of the valve member between the valve shutting part and the depressing valve part, wherein the depressing valve part is formed as directed toward the downstream side of the valve shutting part, the void part is disposed at the site of the increased wall thickness, and the communicating part is intended for effecting fluid control.

In the first-mentioned butterfly valve, the depressing valve part is formed in a smaller diameter than the valve member in order that the depressing valve part may exert a smaller amount of depression on the seat ring than the valve member on the seat ring.

In the first-mentioned butterfly valve, the depressing valve part at least on the orifice side has formed therein an inflow part for admitting a fluid from an outer peripheral surface of the depressing valve part toward the downstream side of the valve member and controlling a volumetric flow rate of the fluid.

In the first-mentioned butterfly valve, the depressing valve part comprises wing-like pieces formed along opposite outer peripheral edges of the valve member as directed toward a direction of shutting the valve member and the wing-like pieces have outer peripheral surfaces thereof formed spherically.

A butterfly valve for opening and shutting an interior of an elastic seat ring mounted in a cylindrical valve casing by rotation of a disc valve member, characterized in that a fluid is allowed not to flow from a nozzle side of the valve member but to flow only from an orifice side thereof to attain high range ability.

In the butterfly valve, an outer peripheral edge of the valve member is provided on a nozzle side and an orifice side with depressing valve parts formed as directed toward a downstream side and the depressing valve part on the orifice side has formed therein an inflow part for admitting the fluid from an outer peripheral surface of the depressing valve part toward the downstream side and adjusting a volumetric flow rate of an incoming fluid.

A butterfly valve for opening and shutting an interior of an elastic seat ring mounted in a cylindrical valve casing by rotation of a disc valve member, wherein the butterfly valve comprises a depressing valve part provided along an outer peripheral edge on an orifice side of the valve member as directed toward a downstream side and an inflow part formed in a neighborhood of the depressing valve part for opening toward a secondary side to enable adjustment of a volumetric flow rate of a fluid to be attained with high accuracy in an area of minute degree of valve opening.

A butterfly valve for opening and shutting an interior of an elastic seat ring mounted in a cylindrical valve casing by rotation of a disc valve member, wherein the valve member is provided along an outer peripheral edge on a nozzle side and an orifice-side outer peripheral edge with wing-like pieces directed toward a downstream side, with lengths of the wing-like pieces on the nozzle side and the orifice side varied to suppress a phenomenon of jumping during break-off of a largest movable part of the valve member from the elastic seat ring.

BEST MODE OF EMBODYING THE INVENTION

The best mode of embodying this invention will be described in detail below with reference to the accompanying drawings.

Figure 5:
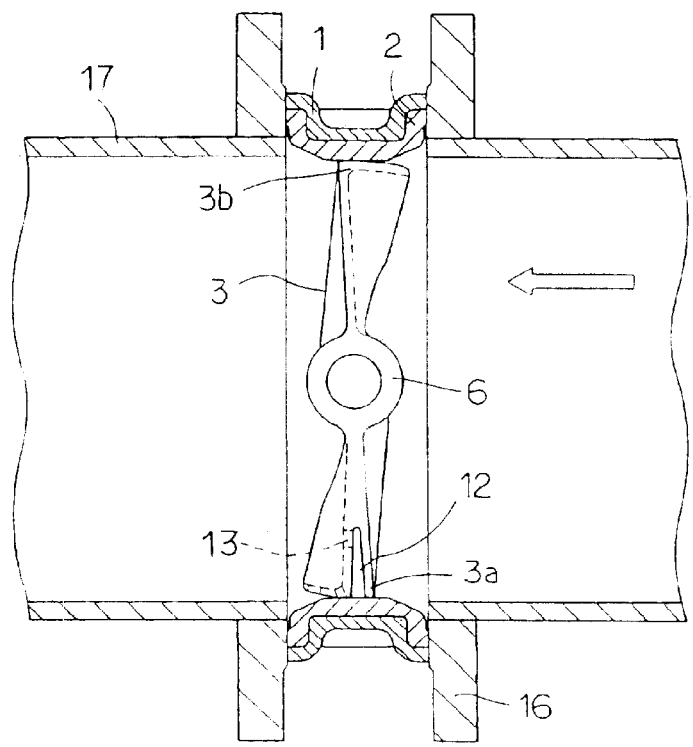
FIG. 5 is a cross section illustrating the butterfly valve of this invention in the state having the degree of valve opening set at 0%.
Figure 6:
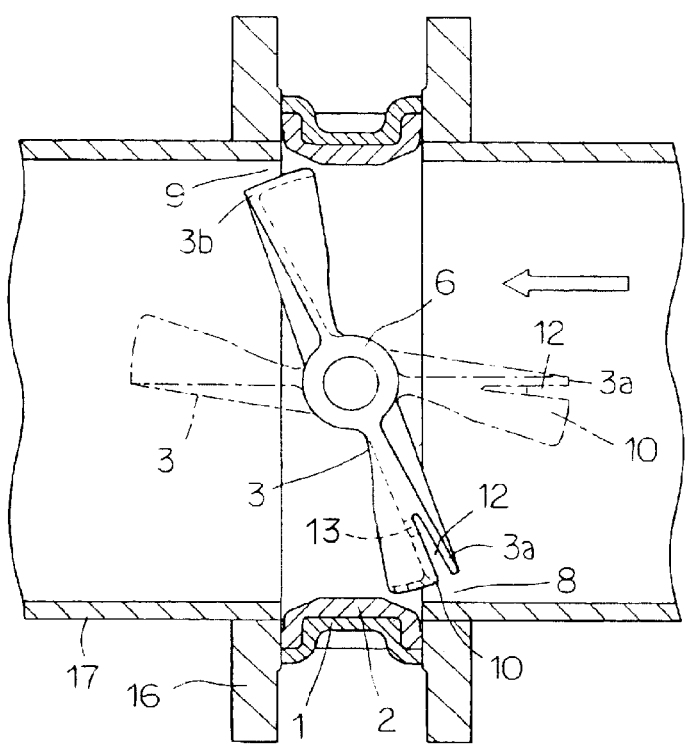
FIG. 6 is a cross section illustrating the butterfly valve in the state having the degree of valve opening set at 28% and at 100%, i.e. full opening, in FIG. 5.

Referring to FIG. 5 and FIG. 6, the butterfly valve of this example is constructed by loading an elastic seat ring 2 made of rubber, such as NBR or EPDM, by means of seizure to the inner wall of a cylindrical valve casing 1 and rotatably disposing a disk-like valve member 3 inside the seat ring 2 and allowing the valve member 3 to be opened and shut.

Figure 1:
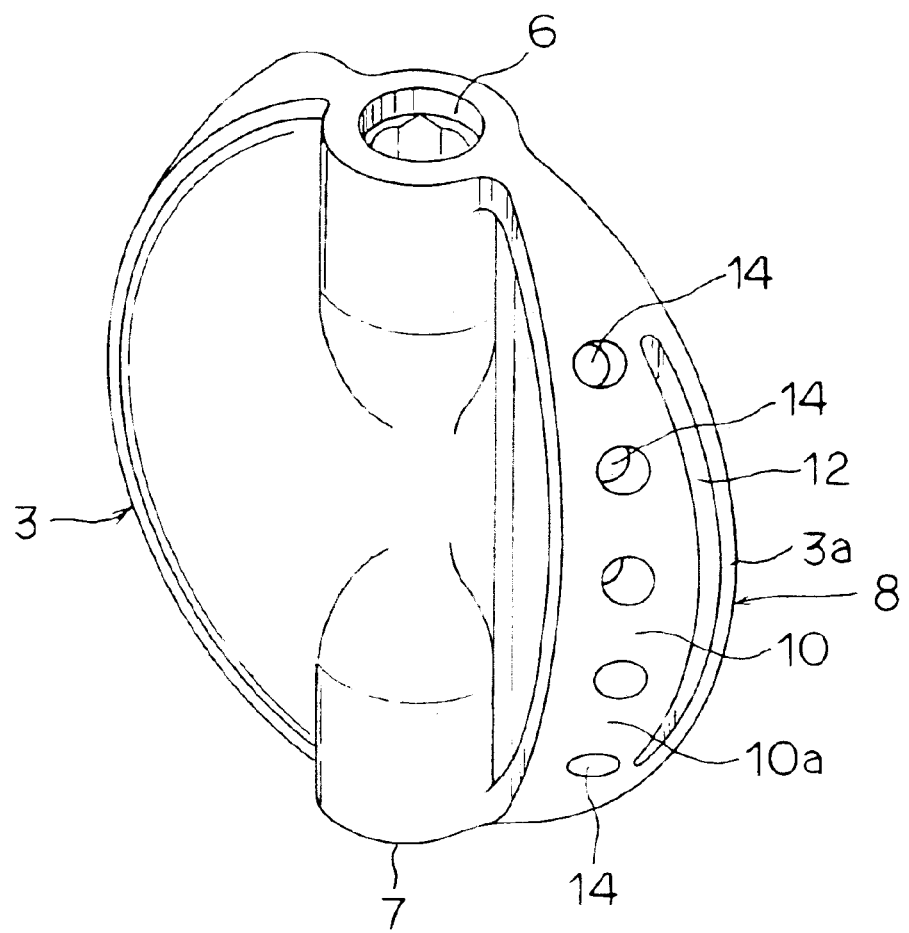
FIG. 1 is a perspective view illustrating one example of the valve member used in a butterfly valve of this invention.

Further, as illustrated in FIG. 1, accommodating parts 6 and 7 intended respectively for an upper stem 4 and a lower stem 5 are formed at the central opposite positions of the valve member 3, and valve shutting parts 3a and 3b formed along the outer peripheral edge of the valve member 3 are so shaped as to manifest a valve shutting function (tight shut function).

Figure 4:
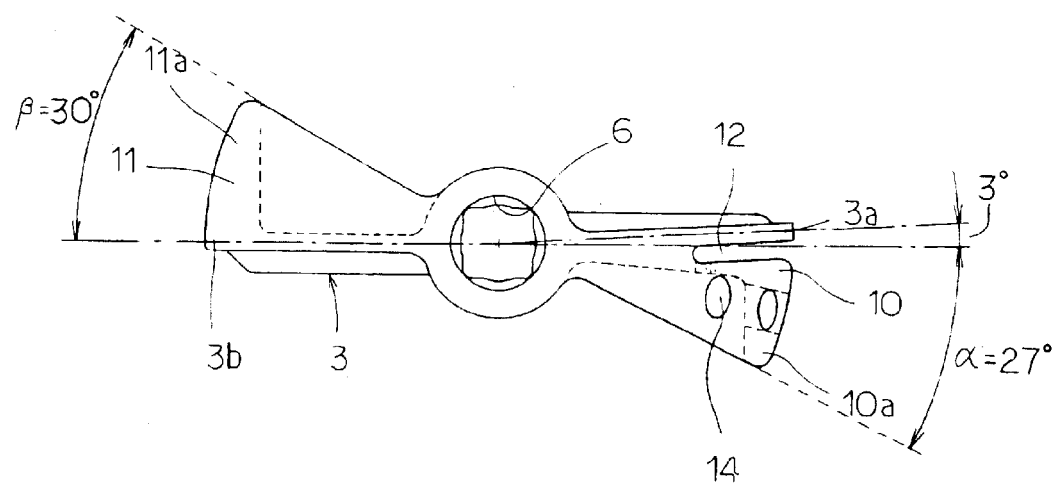
FIG. 4 is a plan view of FIG. 2.

The valve member 3, as illustrated in. FIG. 4, is so formed that the valve shutting part 3a on the orifice side is inclined toward the primary side of the valve at an angle of about 3° relative to the valve shutting part 3b on the nozzle side. Consequently, the valve shutting part 3a on the orifice side contacts the seat ring 2 with a shallow angle and narrows the range in which it is pressed against the seat ring 2 to thereby decrease the amount of its own eating into the seat ring 2. When the valve member 3 is rotated from the position at which the valve is completely shut, therefore, the valve shutting part 3a on the orifice side immediately parts from the seat ring 2 and begins to adjust the volumetric flow rate from the low degree of opening while repressing the occurrence of a sudden motion of the valve member 3, namely the so-called phenomenon of jumping.

The angle of inclination indicated above is preferred to be small for the purpose of starting the adjustment of the volumetric flow rate from the low degree of opening and meanwhile to be large in proportion to the decrease in the nominal diameter of the valve (for example, 3 in the case of 100 mm and 7 in the case of 50 mm). This is because in the valve of a small nominal diameter, the radius of the valve member is small and the width of motion of the valve member is small at the largest movable part (the position perpendicular to the valve shaft) of the valve member relative to the angle of rotation of the valve shaft (stem). This angle of inclination, therefore, is preferred to be in the range of 3 to 7.

Figure 3:
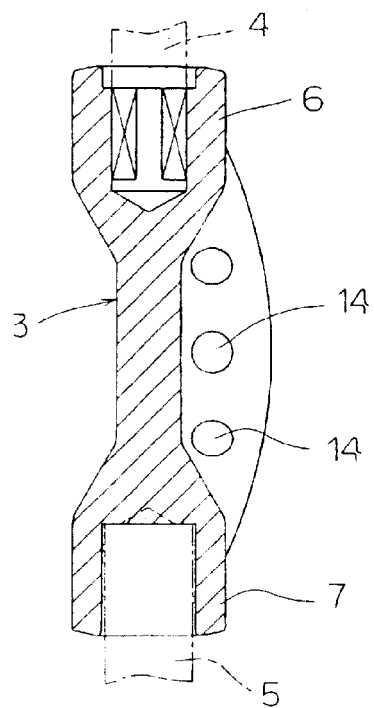
FIG. 3 is a cross section taken through FIG. 2 along line A—A.

Referring now to FIG. 3 and FIG. 4, depressing valve parts 10 and 11 are formed respectively on an orifice side 8 and a nozzle side 9 around the stems 4 and 5 of the valve member 3. The depressing valve parts 10 and 11 are brought into depressing contact with the elastic seat ring 2 during the retention of the valve member 3 in a low degree of valve opening and consequently enabled particularly to prevent the so-called erosion phenomenon from occurring on the orifice side 8. The term "orifice side 8" refers to the opening part having the valve member 3 on the upstream side and the term "nozzle side 9" refers to the opening part having the valve member 3 on the downstream side.

The depressing valve parts 10 and 11 in the present example are wing-like pieces (depressing valve parts) 10a and 11a formed along the opposite outer peripheral edges of the valve member 3 as directed toward the shutting direction of the valve member 3. These wing-like pieces 10a and 11a possess a function of imparting a depressing contact to the elastic seat ring 2 during the retention of the valve member 3 in the low degree of opening, and their outer peripheral surfaces are formed spherically so as to establish a spherical contact with the inner peripheral surface of the seat ring 2. Since the wing-like pieces 10a and 11a have their pressures balance each other owing to the equilibrium between positive pressure and negative pressure, they are enabled to move the valve member 3 with a light force of manipulation and allay markedly the torque of manipulation of the valve.

As shown in FIG. 4, the expression $\acute{a}<\hat{a}$ is satisfied by setting the angle $\acute{a}$ of the wing-like piece 10a on the orifice side 8 at 27 and the angle $\hat{a}$ of the wing-like piece 11a on the nozzle side 9 at 30 respectively with reference to a valve shutting part 3b on the nozzle side. This expression is necessary for preventing the fluid from beginning its flow from the nozzle side 9 even when the wing-like piece 10a on the orifice side 8 parts from the seat ring 2 and a falcate flow path (not shown) formed between the orifice side 8 and the seat ring 2 assumes a state for allowing the fluid to flow, thereby securing the prescribed volumetric flow rate characteristics (such as, for example, the equal percent characteristic) through a communicating part 13, inflow ports 14 and 15 which will be specifically described herein below and the falcate flow path.

By varying the lengths of the depressing valve parts 10 and 11 on the orifice side 8 and the nozzle side 9 as described above, it is made possible to prevent further the occurrence of the jumping phenomenon of the valve member 3 because one of the depressing valve parts is retained as depressed on the seat ring 2 while the other depressing valve part happens to separate from the seat ring 2.

The lengths of the depressing valve parts 10 and 11 are to be set in consideration of factors, such as control of the volumetric flow rate and repression of the cavitation. This setting varies with the diameter of the valve. The expression of $\acute{a}<\hat{a}$ is preferred where the nominal diameter of the valve is 50 mm, for example. When the degree with which the repression of the cavitation is taken into consideration is heightened as when the nominal diameter increased to 150 mm, for example, the adoption of the expression of $\acute{a}>\hat{a}$ may be allowed. The magnitudes of $\acute{a}$ and $\hat{a}$ are only required to satisfy the relation of $\acute{a}$ $\hat{a}$ from the viewpoint of repressing the occurrence of the jumping phenomenon of the valve member 3.

Figure 11:
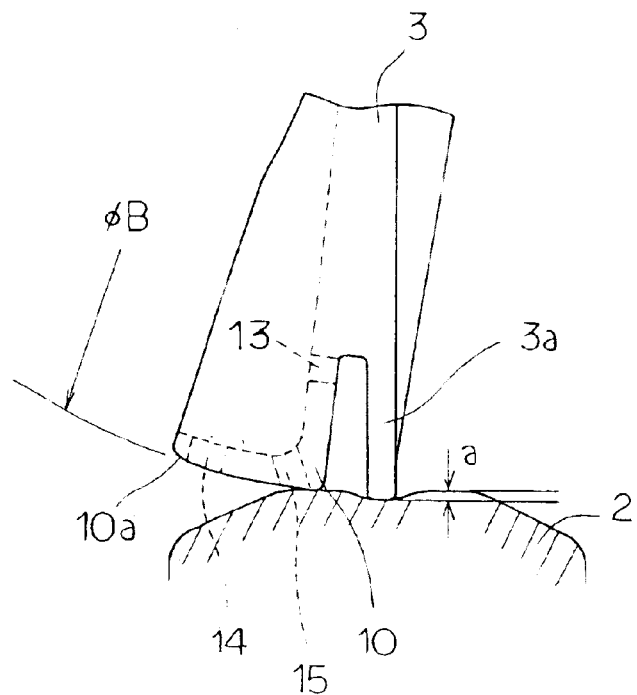
FIG. 11 is a partial explanatory diagram showing the degree of valve opening set at 0% for explaining the jumping phenomenon of the valve member.
Figure 12:
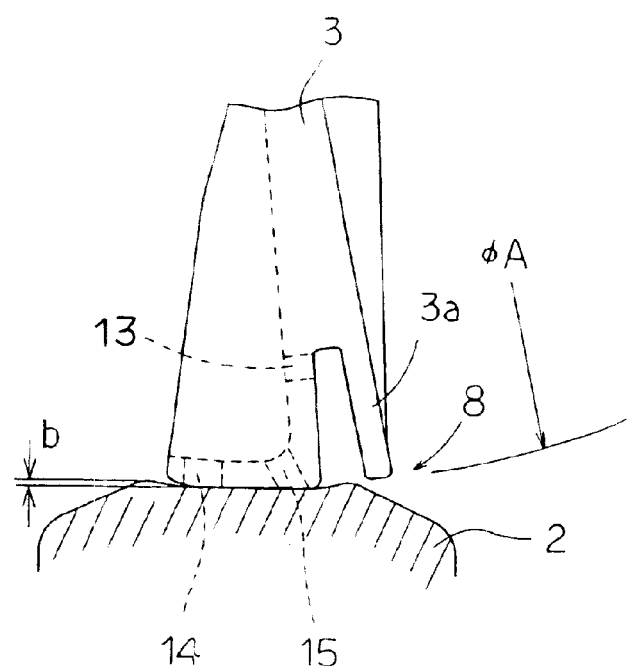
FIG. 12 is a partial explanatory diagram illustrating the state having the degree of valve opening set at 10% in FIG. 11.

In the present example, the diameter ØB of the depressing valve parts 10 and 11 and the diameter ØA of the valve member 3 are identical. The diameter ØB of the depressing valve parts 10 and 11 may be smaller than the diameter ØA of the valve member 3 (valve shutting part 3a) as illustrated in FIG. 11 and FIG. 12. In this case, the amount of depression b exerted by the depressing valve parts 10a and 11a on the seat ring 2 is smaller than the amount of depression a exerted by the valve member 3 on the seat ring 2. That is, by giving a smaller size to the diameter ØB than to the diameter ØA and consequently differentiating the quantities of depression exerted on the seat ring 2 to a>b, it is made possible to decrease the slide resistance on the ØB side in consequence of the rotation of the valve member 3 and prevent the jumping phenomenon from occurring during the retention of the valve member 3 in the low degree of opening.

Figure 9:
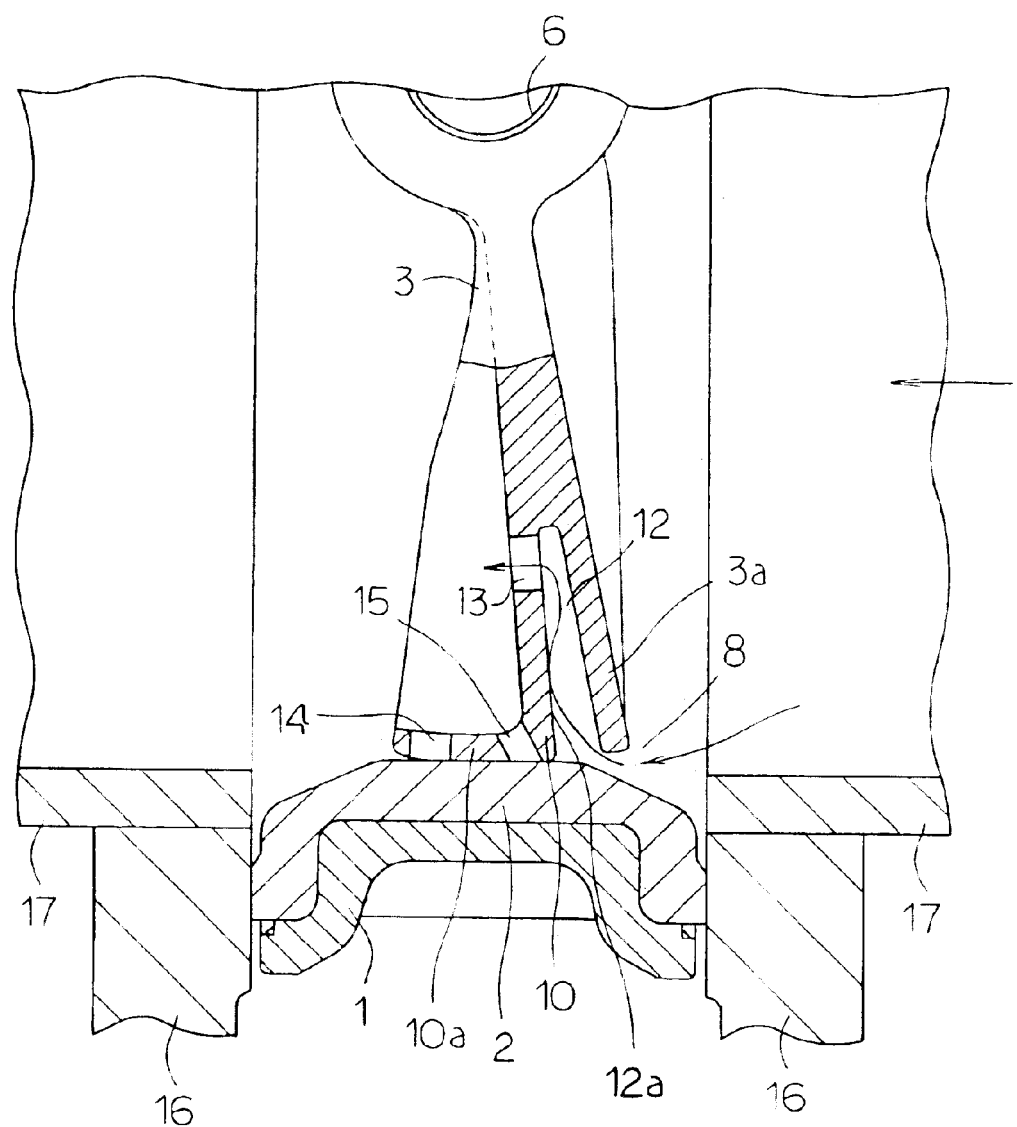
FIG. 9 is partially magnified cross section illustrating the state of the orifice side having the degree of valve opening set at 10%.

On the orifice side 8 of the valve member 3, a void part (slit) 12 is formed in the outer peripheral edge of the valve member 3 or at a position on the downstream side of the outer peripheral edge as illustrated in FIG. 1, and the communicating part (communicating hole) 13 extending from the void part 12 toward the downstream side is formed. This void part (slit) 12 is provided for the purpose of preventing the occurrence of the cavitation by attenuating the fluid flowing from the primary side of the valve via the communicating part 13 to the secondary side of the valve and keeping the pressure thereof from falling below the saturated steam pressure in the area of the minute degree of valve opening (3 to 5 in the present example). With reference to FIG. 9, the void part 12 functions as a pressure chamber for enabling an inner wall 12a of the void part 12 to manifest the function of a resistance plate. The width of this void part (slit) 12 is preferred to be large for the purpose of passing the fluid copiously, but to be small for the purpose of preventing the seat ring 2 from eating into the slit 12. Furthermore, though the optimum size of this slit 12 is variable with the nominal diameter of the valve, it is set in the range of 3 mm to 10 mm in due consideration of the possibility that the slit 12 may be formed during the course of casting. The depth of this slit 12 is set in the range of ⅓ to ½ of the distance from the largest movable part of the valve member to the center of the valve member in consideration of the setting operation of the volumetric flow rate and cast-forming operation.

The communicating part 13 is provided for the purpose of controlling the volumetric flow rate of the fluid advancing from the primary side of the valve to the secondary side of the valve in the area of a minute degree of valve opening. In the present example, four such communicating parts 13 are disposed at the site of the largest rotation on the orifice side. The size, shape and quantity of these parts are arbitrarily selected to suit the actual performance of the disposition. The characteristics of volumetric flow rate can be arbitrarily altered through variation in the diameter of holes and the intervals of arrangement.

The communicating part 13, when disposed in the proximity of the bottom part of the slit 12, is enabled to pass the fluid toward the secondary side of the valve while keeping the interior of the slit 12 in a state fully liberated from the influence of the cavitation. The shape and the quantity of such communicating parts 13 are arbitrarily selected to suit the characteristic properties of the fluid to be handled. By having the total surface area of openings in the communicating part 13 equal or exceed the area of openings in the slit 12 in the outer peripheral part of the valve member, it is made possible to guide the fluid flowing into the slit 12 efficiently toward the secondary side without requiring the fluid to be unduly squeezed.

Figure 13:
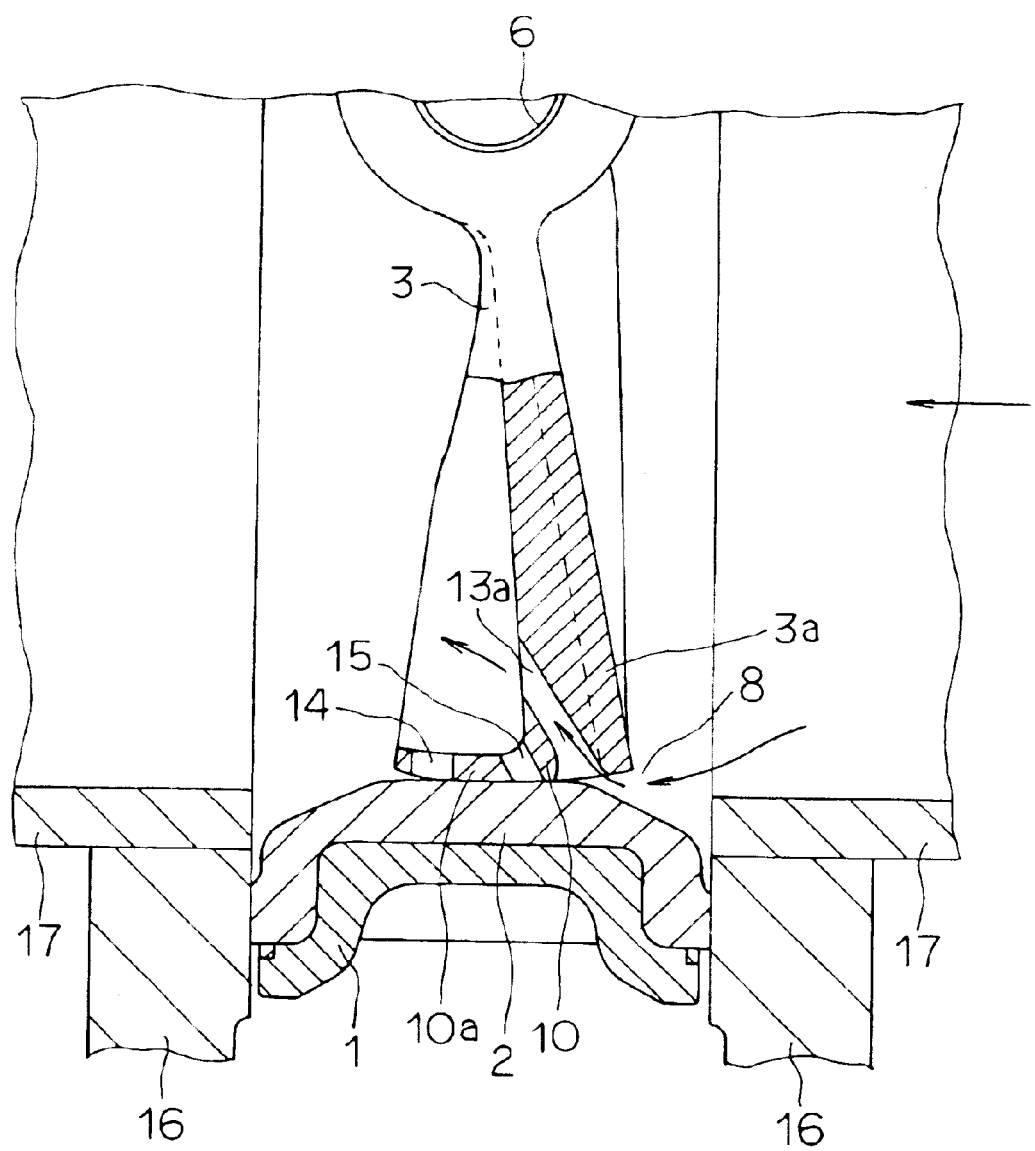
FIG. 13 is a partially magnified cross section illustrating another example of the state shown in FIG. 9.

In the wing-like piece 10a on the orifice side 8, a plurality of minute inflow parts (inflow ports) 14 adapted to advance the fluid from the outer peripheral surface toward the downstream side are disposed radially as illustrated in FIG. 1 and a plurality of minute inflow parts (inflow ports) 14 and a plurality of minute inflow parts 15 both adapted to advance the fluid from the outer peripheral surface toward the downstream side are disposed radially as illustrated in FIG. 9 and FIG. 13. These inflow parts 14 and 15 are each so disposed as to produce an action of rectifying the fluid. Incidentally, the minute inflow parts 15 are disposed more toward the slit 12 side than toward the minute inflow parts 14 and are intended to exalt the discrimination of the control of the volumetric flow rate relative to the angle of rotation of the valve shaft (stem). It is preferred that they are provided for a valve having a particularly large nominal diameter such as, for example, a nominal diameter of not less than 200 mm.

These inflow ports 14 and 15 are provided for the purpose of controlling the volumetric flow rate of the fluid advancing from the primary side toward the secondary side in cooperation with the communicating part 13 mainly in the area of a low degree of valve opening (5 to 30 in the present example).

Figure 2:
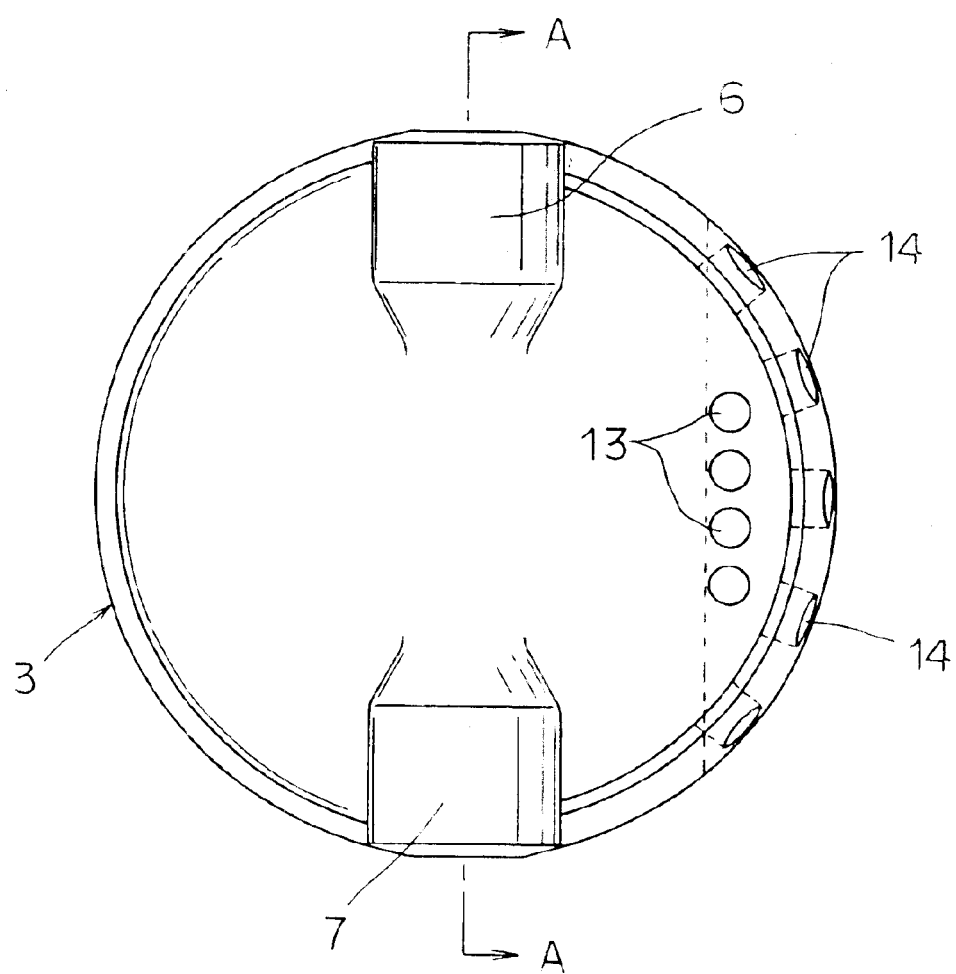
FIG. 2 is a front view of FIG. 1.

In the present example, five circular inflow ports (inflow parts) 14 of one and the same shape are disposed on meridians on the spherical outer peripheral surface of the wing-like piece 10a at angular intervals of 20 degrees around the largest movable part of the valve member 3 as illustrated in FIG. 1 and FIG. 2. When the valve is opened, the fluid begins to flow simultaneously through the five ports 14 in consequence of the rotation of the valve member 3. The volumetric flow rates of the fluid through the individual ports 14 become varied with the differences of their positions in proportion as the degree of opening of the valve increases.

Since the valve member 3 is not provided on the nozzle side 9 thereof with any hole for intercommunicating the primary side and the secondary side of the valve as illustrated in FIG. 4, the fluid in the area of a minute degree of valve opening and the area of a low degree of valve opening wholly flows via the communicating parts 13 and the inflow ports 14 provided in the valve member 3 on the orifice side 8. Thus, it is made feasible to obtain a butterfly valve that permits the volumetric flow rate of a fluid to be accurately controlled even in the area of a low degree of valve opening and materializes high range ability.

In the diagram, the reference numeral 16 denotes each of flange parts fixed to a pipe 17. The butterfly valve-of this example is mounted between the flange parts 16 and 16 as nipped with bolts and nuts.

Now, the action of the mode of embodiment described above will be explained below.

Referring to FIG. 5, when the liquid (fluid), such as water, flows in from the right side indicated with an arrow mark while the valve member 3 remains in a state of complete shut (degree of valve opening: 0%), the valve shutting parts 3a and 3b of the valve member 3 are tightly depressed on the seat ring 2 made of rubber and allowed to retain a completely shut state.

In the completely shut state, the nozzle side valve shutting part 3b is tightly depressed in a slightly inclined posture on the seat ring 2, and the orifice side valve shutting part 3a is tightly depressed on the seat ring 2 as inclined with a greater angle.

When the valve member 3 is then rotated counterclockwise to a degree of valve opening (in the range of 5 to 10%) as illustrated in FIG. 9, the orifice side valve shutting part 3a separates from the seat ring 2 without entailing the jumping phenomenon as described above, and the nozzle side valve shutting part 3b is subsequently separates from the seat ring 2.

In this case, owing to the fact that the liquid advancing at a minute volumetric flow rate begins to be rectified from the neighborhood of the orifice side largest rotating part of the valve member 3 onward, the communication from the communicating part 13 through the secondary side of the valve is continued while the occurrence of a vortex or turbulence is suppressed, and the liquid collides against the inner wall 12a of the void part 12 particularly when it flows into the slit 12 at a minute volumetric flow rate. As a result, it is made possible to allay the impetus of the flow of the liquid to such an extent as avoids falling short of the saturated steam pressure, inhibit the occurrence of a low pressure part, suppress the occurrence of cavitation, and keep the occurrence of noise down. Since the surface area of the opening of the void part 12 is increased and the volumetric flow rate is increased a bit at a time as the rotation of the valve member 3 is continued, the butterfly valve is enabled to control the minute volumetric flow rate of the liquid with high accuracy and function as a control valve.

Specifically, since the depressing valve part 10 of the valve member 3, namely the wing-like piece 10a in the present example, makes a depressing contact with the elastic seat ring 2, the liquid is infallibly passed through the communicating part 13 without escaping between the depressing valve part 10 and the elastic seat ring 2. As a result, the elastic seat ring 2 is not impaired by the so-called phenomenon of erosion, but is enabled to effect fine adjustment of the volumetric flow rate of the liquid, depending on the shape of the communicating part 13.

Referring to FIG. 11 and FIG. 12, when the degree of valve opening is changed from 0%, namely the magnitude representing the state of complete shut of the valve, to 10%, since the quantities of the depressing force exerted by the depressing valve parts 10 and 11 on the seat ring 2 have the relation a>b, the depressing force exerted by the spherical wing-like pieces 10a and 11a of the depressing valve parts 10 and 11 on the inner peripheral surface of the seat ring 2 is weaker than the depressing force exerted by the valve shutting part 3a on the seat ring 2. In a minute degree of valve opening, the valve member 3 does not begin to rotate suddenly because the slide resistance offered to the rotation of the valve shaft is small. Thus, the degree of valve opening can be finely adjusted, and the so-called phenomenon of jumping can be infallibly prevented.

Figure 10:
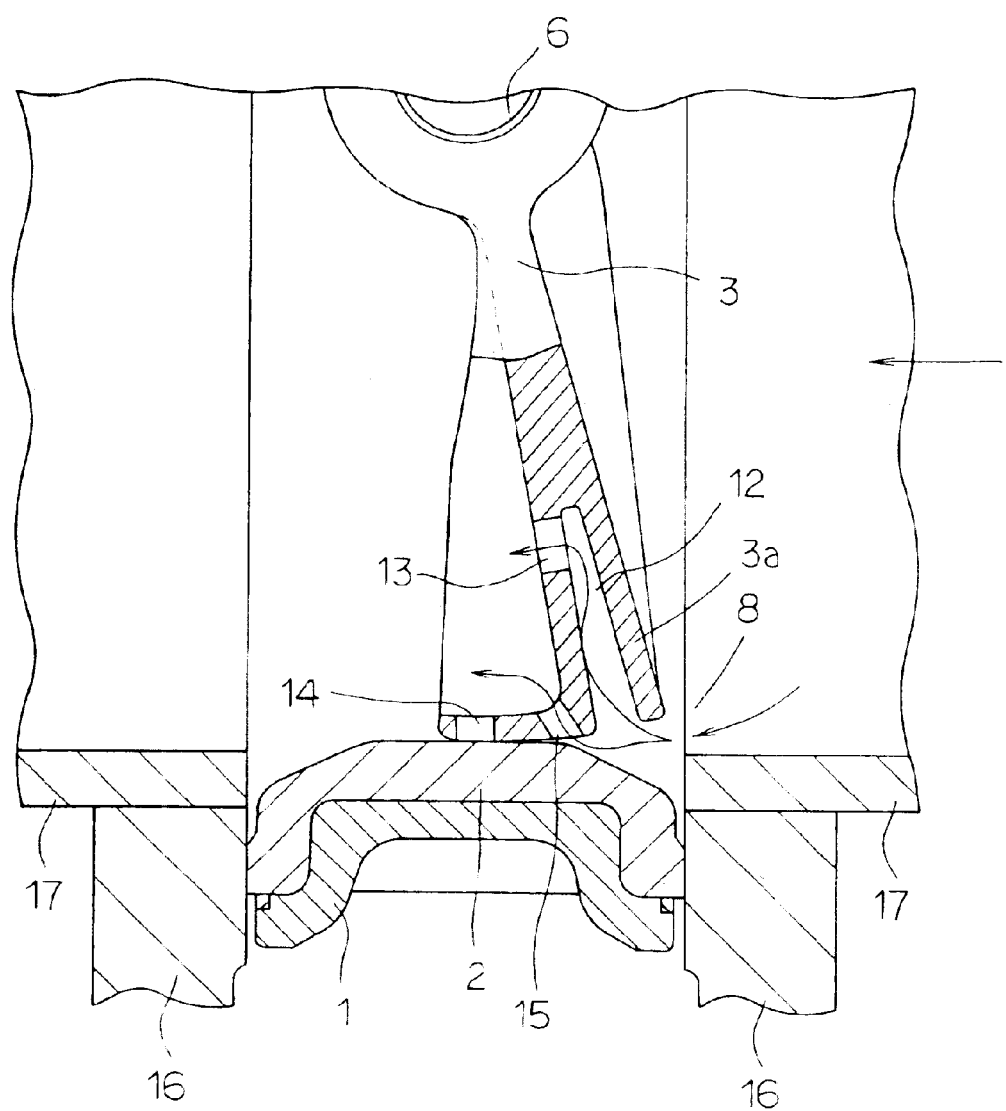
FIG. 10 is a partially magnified cross section illustrating the state of FIG. 9 having the degree of valve opening set at 15%.

When the degree of valve opening is increased further to 15% as illustrated in FIG. 10, the liquid (fluid) is passed from the largest rotating part of the valve member 3 through the void part 12, rectified and released by the communicating part 13, and made to flow in through the minute inflow part 15. Since the liquid is rectified and restrained from a vortex or turbulence as well, inhibited from suddenly increasing the flow velocity, and allowed to prevent the occurrence of a low-pressure part, the cavitation can be prevented from occurring and the minute volumetric flow rate can be rectified and adjusted.

Even in this degree of valve opening, the liquid infallibly passes the communication part 13 and the minute inflow port 15 without leaking between the depressing valve part 10 and the elastic seat ring 2 because the depressing valve part 10 of the valve member 3 remains in depressing contact with the elastic seat ring 2. As a result, the control of the minute volumetric flow rate of the liquid depending on the shapes of the communicating part 13 and minute inflow part 15 can be accomplished without suffering the elastic seat ring 2 to be impaired by the so-called phenomenon of erosion.

When the degree of valve opening is further increased to 28% as illustrated in FIG. 6, the liquid on the orifice side 8 establishes communication from the void part 12 through the communicating part 13 and flows in radially through the minute inflow parts 14 and 15. When the valve member 3 passes the orifice side 8, therefore, the liquid is inhibited from generating vortex or turbulence on the orifice side, allowed to undergo rectification and secure inflow, repressed from inducing cavitation, prevented from causing erosion, and repressed from emitting noise and vibration.

In the degree of valve opening illustrated in FIG. 6, though the liquid passes the space intervening between the depressing valve part 10 and the elastic seat ring 2, the impairment of the elastic seat ring 2 by the so-called phenomenon of erosion cannot occur because the liquid is allowed to flow as dispersed to the communicating part 13 and the minute inflow parts 14 and 15 as well.

Thus, when the valve member 3 is rotated as illustrated in FIG. 5 and FIG. 6, since the spherical wing-like pieces 10*a* and 11*a* of the depressing valve parts 10 and 11 are exerting depressing pressure on the inner peripheral surface of the seat ring 2 as described above, the valve member 3 cannot be suddenly rotated by the repulsive force of the seat ring 2, and the degree of valve opening can be finely adjusted in the minute degree of valve opening. The butterfly valve, therefore, can prevent the so-called phenomenon of jumping infallibly and can as well manifest the function as a control valve that materializes adjustment of the volumetric flow rate.

Figure 7:
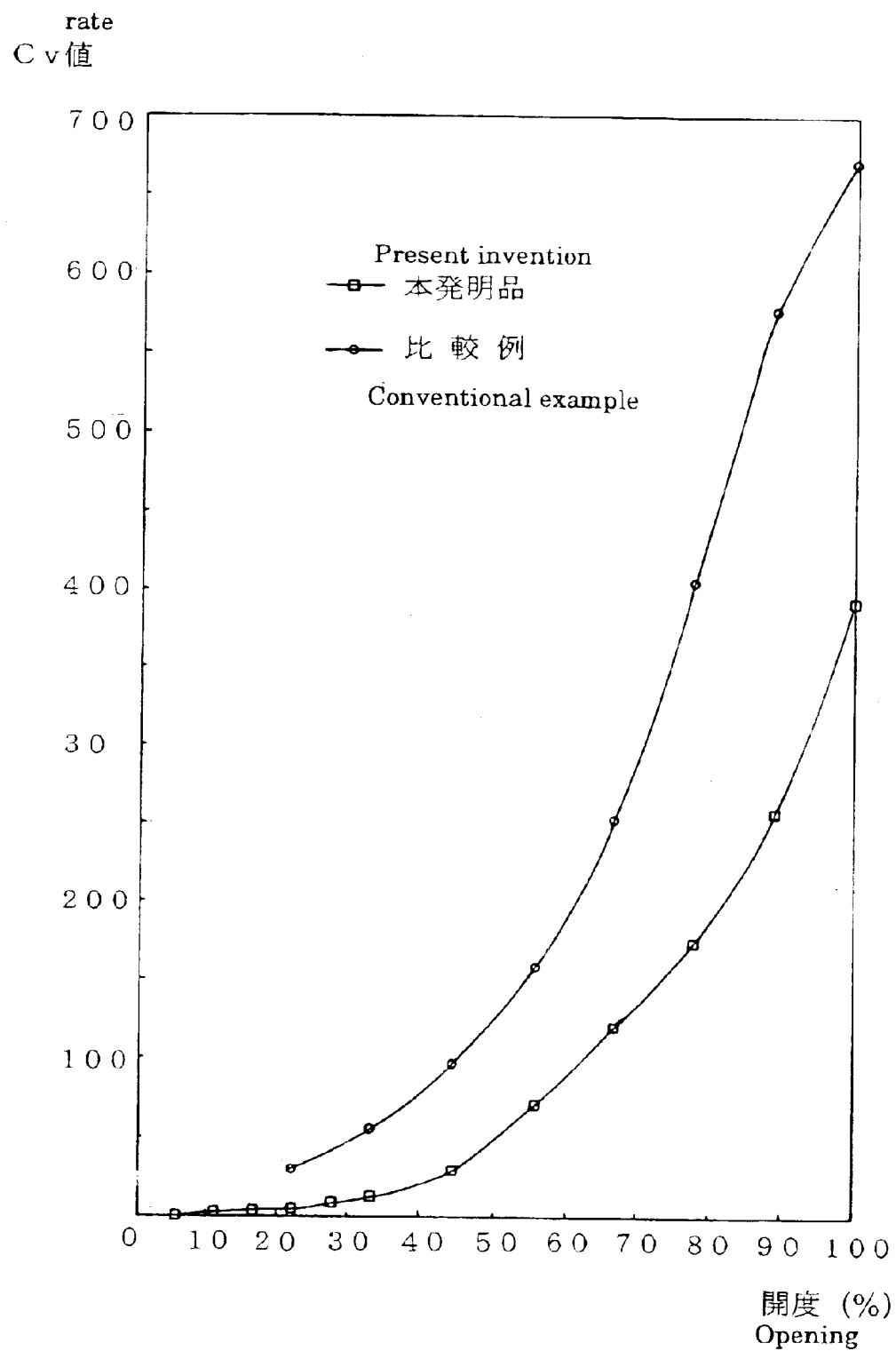
FIG. 7 is a graph showing the characteristic of high range ability manifested by the butterfly valve of this invention.
Figure 8:
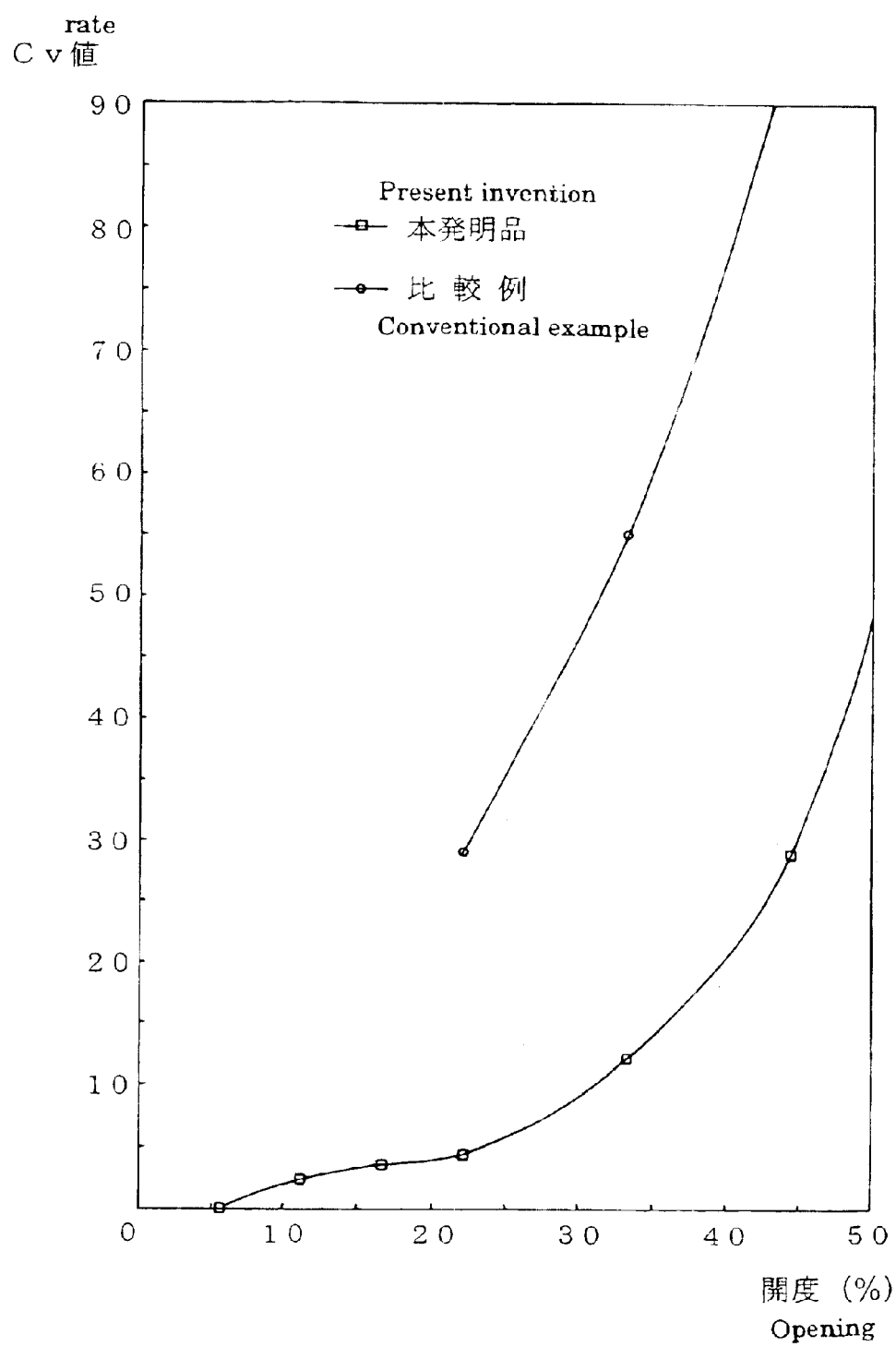
FIG. 8 is a graph showing the range of low degree of opening in FIG. 7 on a magnified scale.

In the case of the butterfly valve which uses a rubber seat, the control of the volumetric flow rate is generally carried out by adjusting the position of the valve member in the range of the degree of valve opening of 30 to 70 as clearly noted from the data of comparative examples shown in FIG. 7 and FIG. 8. In contrast, according to the present example, since the adjustment of the volumetric flow rate is realized in the range of 0 to 30 as shown in the diagram, the butterfly valve can decrease the magnitude of Cv as much as possible in the degree of valve opening which is capable of adjusting the volumetric flow rate and can attain high range ability. FIG. 7 is a graph showing the relation between the degree of valve opening and the magnitude of Cv and showing the state of high range ability attained in this invention and serving to demonstrate that the butterfly valve of this invention manifests a high range ability characteristic. Incidentally, in this case, the numerical value of Cv exhibited by the butterfly valve of this invention falls below that exhibited by the butterfly valve of the comparative example as the valves approach the degrees of full opening. When the butterfly valve of this invention is used in a feed line of hot water or cold water particularly to an air conditioner, the fall of the magnitude of Cv actually brings no effect on the actual operation because the butterfly valve is generally used in a low degree of valve opening.

In the diagram, the data are invariably those obtained of the samples having a nominal valve diameter of 100 mm and using valve members made of SCS13A. The data of the comparison are those obtained of butterfly valves using a known central type valve member that forms neither a flow path port nor a wing-like part. The seat ring and other parts formed in this conventional valve member are similar to those used in the valve member of the butterfly valve of this invention.

The comparative sample indicated in the diagram is capable of accurately controlling the volumetric flow rate in the degrees of valve opening approximately in the range of 30% to 80% and manifesting range ability of 10:1. In contrast, the sample of the prevent invention is demonstrated to be capable of accurately controlling the volumetric flow rate in degrees of valve opening approximately in the range of 10% to 100% and manifesting a high range ability characteristic of 200:1.

FIG. 13 illustrates another example of the butterfly valve to which this invention relates. Like parts used in the preceding example will be denoted by like reference numerals and omitted from the following description. In the construction shown in the diagram, a plurality of flow path holes 13*a* are provided instead of the slit and, through the communicating parts (flow path holes) 13*a*, the butterfly valve of this construction admits the inflow of the fluid, permits adjustment of the volumetric flow rate, and fulfills substantially the same function and effect as the preceding example.

Figure 14:
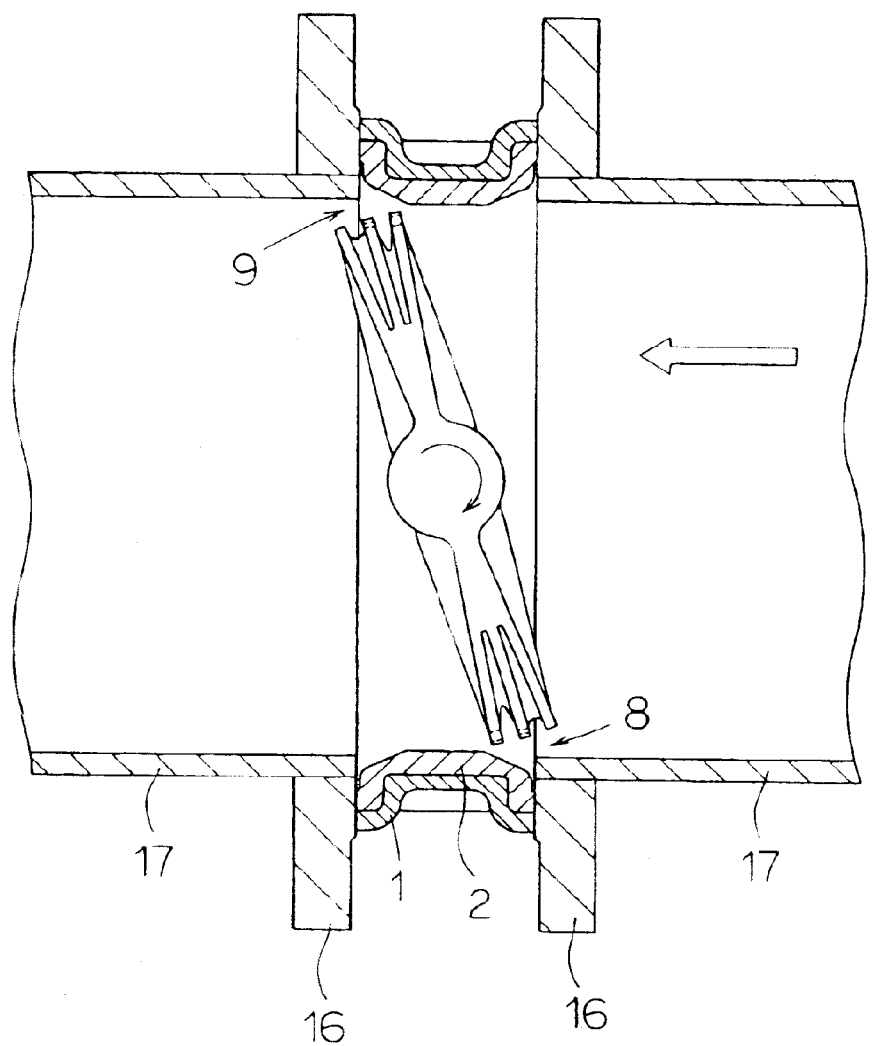
FIG. 14 is an explanatory cross section illustrating another example of the butterfly valve contemplated by this invention.
Figure 15:
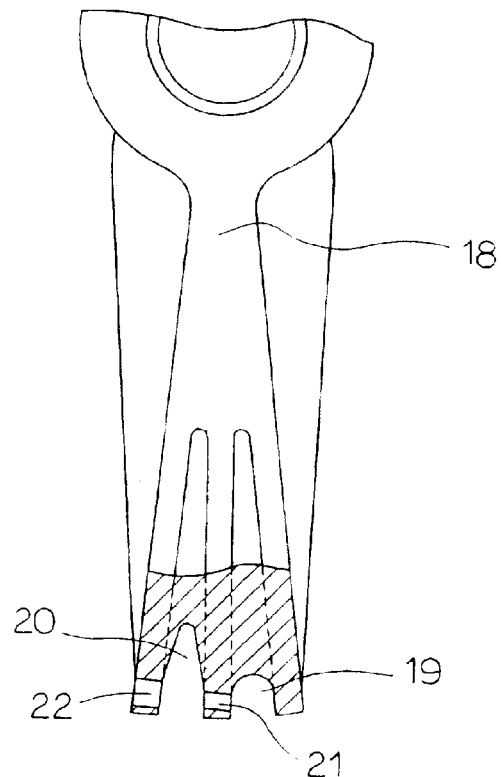
FIG. 15 is a partially cutaway magnified diagram of the valve member shown in FIG. 14.
Figure 16:
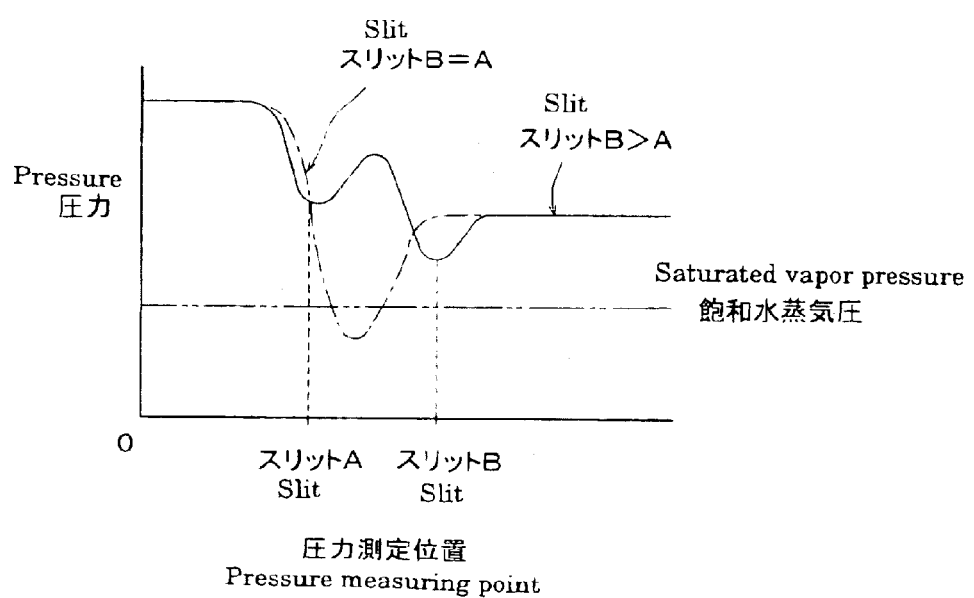
FIG. 16 is an explanatory diagram for illustrating the prevention of the occurrence of cavitation in the valve structure shown in FIG. 15.

FIG. 14, FIG. 15 and FIG. 16 illustrate another example of the valve member contemplated by this invention. In this construction, slits 19 and 20 are formed in the outer periphery of a valve member 18 and communicating holes 21 and 22 are further formed so as to effect rectification of the fluid, prevent the occurrence of a low pressure part on the rear stream side of the valve member 18, suppress the cavitation, and render it possible as well to control the volumetric flow rate in the area of a low degree of valve opening. In this case, the communicating holes 21 and 22 are so formed as to give a greater diameter to the former hole 21 than to the latter hole 22 and enable the volumetric flow rate to increase in accordance as the degree of valve opening is enlarged.

Further, by forming the slits 19 and 20 so as to give a larger size to the former slit 19 than to the latter slit 20, it is made possible to attenuate the fluid pressure stepwise and prevent the occurrence of the cavitation. Specifically, by establishing the relation of slit 19>slit 20 as illustrated in FIG. 15 and FIG. 16, the occurrence of the cavitation is prevented by keeping the pressure of the fluid from falling below the saturated steam pressure.

Figure 17:
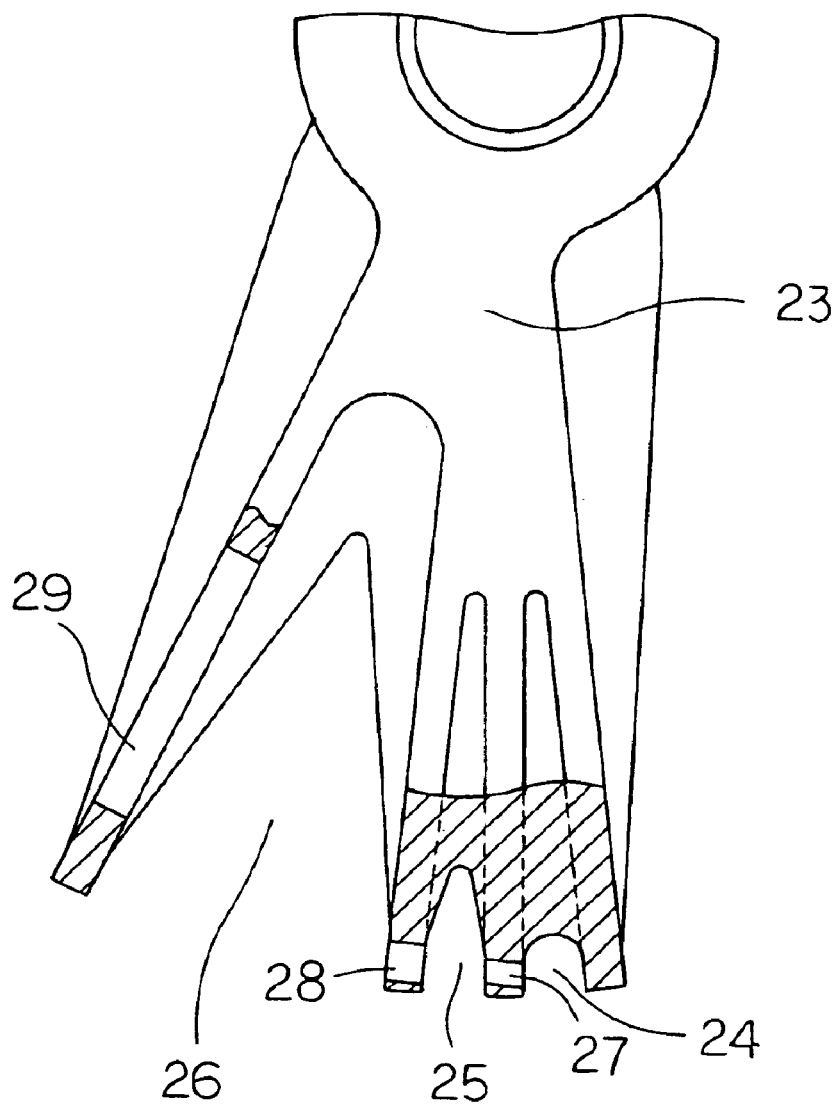
FIG. 17 is a partially cutaway magnified diagram of a valve member depicting yet another example of the butterfly valve contemplated by this invention.

FIG. 17 illustrates yet another example of the valve member contemplated by this invention. It is provided with slits 24, 25 and 26 and communicating holes 27, 28 and 29. Of course, this example manifests the same function and effect as the other examples cited above.

By disposing a strainer on the upstream side of the butterfly valve of each of the examples of this invention and utilizing it as a component of the relevant valve system, it is made possible to guide the liquid deprived of foreign matter by the strainer to the butterfly valve of this invention and prevent the communicating part 13 and the inflow parts 14 and 15 from being clogged and allow the control of the volumetric flow rate with high accuracy to be continued.

Industrial Applicability

According to this invention, there is provided a butterfly valve which is capable of producing tight shut due to the use of an elastic seat ring, preventing the elastic seat ring from yielding to the phenomenon of erosion, and realizing prominently high range ability as compared with the conventional butterfly valve.

By substituting the valve member of this invention in a butterfly valve using the ordinary seat ring, the butterfly valve may be utilized as a control valve that can be used in a low degree of valve opening.

This invention can further provide a butterfly valve that is an inexpensive control valve which is capable of assigning a wide range for the adjustment of volumetric flow rate properties, such as an equal percent characteristic, allaying noise, and suppressing torsion.

Since the valve member is formed as inclined, the control valve is enabled to suppress the phenomenon of jumping, namely a sudden motion of the valve member and begin the adjustment of the volumetric flow rate when the valve member is set to rotating from the position of complete shut.

By varying the length of the depressing valve part on both the orifice side and the nozzle side, it is made possible to prevent the valve member infallibly from developing the phenomenon of jumping even when either of the depressing valve parts happens to separate from the seat ring because the other depressing valve part is retained in a state of being depressed on the seat ring.

What is claimed is:

1. A butterfly valve for opening and shutting an interior of an elastic seat ring mounted in a cylindrical valve casing by rotation of a disc valve member, wherein the butterfly valve comprises valve shutting part formed along an outer peripheral edge of the valve member on an orifice side and on a nozzle side to create tight shut, depressing valve parts formed on the valve shutting parts and adapted to make depressing contact with the elastic seat ring toward a shutting direction of the valve shutting parts, a void part formed between the depressing valve part on the orifice side and the valve shutting part on the orifice side, and a communicating part formed in the valve member and adapted to establish communication from an interior of the void part toward downstream side, thereby allowing a fluid not to flow from the nozzle side of the valve member but to flow only from the orifice side thereof, to attain high range ability in an area of low degree of valve opening or in an area of fine degree of valve opening.

2. The butterfly valve according to claim 1, further comprises the tight-shut valve shutting parts formed along the outer peripheral edge of the valve member and including said valve shutting part disposed on the orifice side, and a site of an increased wall thickness of the valve member between the valve shutting part and the depressing valve part, wherein the depressing valve part is formed as directed toward the downstream side of the valve shutting part, the void part is disposed at the site of the increased wall thickness, and the communicating part is intended for effecting fluid control.

3. The butterfly valve according to claim 1, wherein the depressing valve part is formed in a smaller diameter than the valve member in order that the depressing valve part may exert a smaller amount of depression on the seat ring than the valve member on the seat ring.

4. The butterfly valve according to claim 1, wherein the depressing valve part on the orifice side has formed therein an inflow part for admitting the fluid from an outer peripheral surface of the depressing valve part toward the downstream side and controlling a volumetric flow rate of an incoming fluid.

5. The butterfly valve according to claim 1, wherein the depressing valve part comprises wing-like pieces formed along opposite outer peripheral edges of the valve member as directed toward a direction of shutting the valve member and the wing-like pieces have outer peripheral surfaces thereof formed spherically.

6. A butterfly valve for opening and shutting an interior of an elastic seat ring mounted in a cylindrical valve casing by rotation of a disc valve member, wherein the butterfly valve comprises wing-like depressing valve parts provided along an outer peripheral edge of the valve member on an orifice side and on a nozzle side, having outer peripheral surfaces formed spherically toward the downstream side, and adapted for depressing contact with the elastic seat ring in an area of minute degree of valve opening, and a fluid path port formed in a neighborhood of the depressing valve part on the orifice side and opening into a secondary side of the butterfly valve, thereby permitting a volumetric flow rate of a fluid to be adjusted with high accuracy in the area of minute degree of valve opening.

7. A butterfly valve for opening and shutting an interior of an elastic seat ring mounted in a cylindrical valve casing by rotation of a disc valve member, wherein the butterfly valve comprises wing-like pieces provided along an outer peripheral edge of the valve member on a nozzle side and on an orifice side as directed toward a downstream side, with lengths of the wing-like pieces on both the nozzle side and the orifice side varied to enable one of the wing-like pieces to retain a state of being depressed on the elastic seat ring while the other wing-like piece tends to separate from the elastic seat ring and consequently suppress the valve member from developing a phenomenon of jumping in an area of low degree of valve opening or in an area of minute degree of valve opening.

* * * * *